United States Patent
Da Silva et al.

(10) Patent No.: US 10,554,355 B2
(45) Date of Patent: Feb. 4, 2020

(54) STATION (STA) AND METHOD FOR USAGE OF PHASE NOISE COMPENSATION BASED ON OPERATIONAL PARAMETERS

(71) Applicant: Intel Corporation, Santa Clara, CA (US)

(72) Inventors: Claudio Da Silva, San Jose, CA (US); Hosein Nikopour, San Jose, CA (US); Wook Bong Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 15/281,722

(22) Filed: Sep. 30, 2016

(65) Prior Publication Data

US 2018/0097593 A1    Apr. 5, 2018

(51) Int. Cl.
*H04L 5/00* (2006.01)
*H04W 24/08* (2009.01)
(Continued)

(52) U.S. Cl.
CPC .......... *H04L 5/0048* (2013.01); *H04L 1/0083* (2013.01); *H04W 24/08* (2013.01);
(Continued)

(58) Field of Classification Search
CPC ......... H04L 27/38; H04L 27/00; H04L 29/08; H04L 27/06; H04L 29/06; H04L 27/26; H04L 25/03; H04L 1/00
(Continued)

(56) References Cited

U.S. PATENT DOCUMENTS

2004/0171352 A1    9/2004   Maeda et al.
2006/0067432 A1*   3/2006   Thesling .................. H04L 7/10
                                                         375/326
(Continued)

FOREIGN PATENT DOCUMENTS

WO    2018063669    4/2018

OTHER PUBLICATIONS

"3GPP TSG RAN WG1 #85 R1-165685", WF on Phase Noise ModelingNokia, Alcatel-Lucent Shanghai Bell,NTT DoCoMo, Samsung, Qualcomm,Ericsson, Intel, InterDigital, (May 2016), 8 pgs.
(Continued)

*Primary Examiner* — Faruk Hamza
*Assistant Examiner* — Jean F Voltaire
(74) *Attorney, Agent, or Firm* — Kowert, Hood, Munyon, Rankin & Goetzel, P.C.

(57) ABSTRACT

Embodiments of a station (STA) and method for communication in accordance with phase noise compensation are generally described herein. The STA may determine, based at least partly on one or more operational parameters, whether to perform phase noise compensation of data symbols of a received protocol data unit (PDU). For instance, the STA may compare the operational parameters with one or more thresholds. The STA may further determine a method of phase noise compensation based at least partly on one or more operational parameters. As an example, the STA may determine a type of interpolation to be used for an interpolation of phase noise estimates of pilot symbols to determine phase noise estimates of data symbols. Example operational parameters may include a signal quality metric, a carrier frequency offset (CFO) measurement and/or modulation and coding scheme (MCS).

18 Claims, 8 Drawing Sheets

(51) Int. Cl.
  *H04L 1/00*   (2006.01)
  *H04L 27/00*   (2006.01)
  *H04L 27/227*   (2006.01)
  *H04L 7/10*   (2006.01)
  *H04L 7/04*   (2006.01)

(52) U.S. Cl.
  CPC .................................. *H04L 7/04* (2013.01);
       *H04L 7/10* (2013.01); *H04L 27/0014*
       (2013.01); *H04L 27/2275* (2013.01); *H04L 2027/003* (2013.01)

(58) Field of Classification Search
  USPC ........................................................ 370/329
  See application file for complete search history.

(56) References Cited

U.S. PATENT DOCUMENTS

| | | |
|---|---|---|
| 2008/0013650 A1 | 1/2008 | Engdahl |
| 2011/0142142 A1* | 6/2011 | Jwa ........................ H04L 25/022 375/259 |
| 2014/0198872 A1* | 7/2014 | Barriac ................. H04W 24/08 375/285 |
| 2015/0055497 A1* | 2/2015 | Cheng ................. H04W 52/262 370/252 |
| 2016/0029331 A1* | 1/2016 | Seo ...................... H04W 56/002 370/350 |
| 2016/0218844 A1* | 7/2016 | Suh ........................ H04L 5/0048 |
| 2016/0286011 A1* | 9/2016 | Kasher .................... H04L 69/22 |

OTHER PUBLICATIONS

"International Application Serial No. PCT/US2017/049124, International Search Report dated Dec. 11, 2017", 3 pgs.

"International Application Serial No. PCT/US2017/049124, Written Opinion dated Dec. 11, 2017", 11 pgs.

* cited by examiner

STATION (STA) AND METHOD FOR USAGE OF PHASE NOISE COMPENSATION BASED ON OPERATIONAL PARAMETERS

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to millimeter wave (mmWave) communication, including mmWave communication in accordance with IEEE 802.11ad, IEEE 802.11ay and/or Fifth Generation (5G) networks. Some embodiments relate to receiver impairments, including phase noise.

BACKGROUND

Mobile devices may communicate with a base station of a mobile network to exchange data, voice and other information. In some cases, performance of the mobile device may be affected by any number of factors, including various receiver issues and challenges. For instance, phase noise associated with operation of the mobile device may affect the ability of the mobile device to receive data from the base station, in some cases. Accordingly, there is a general need for methods and systems that address these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
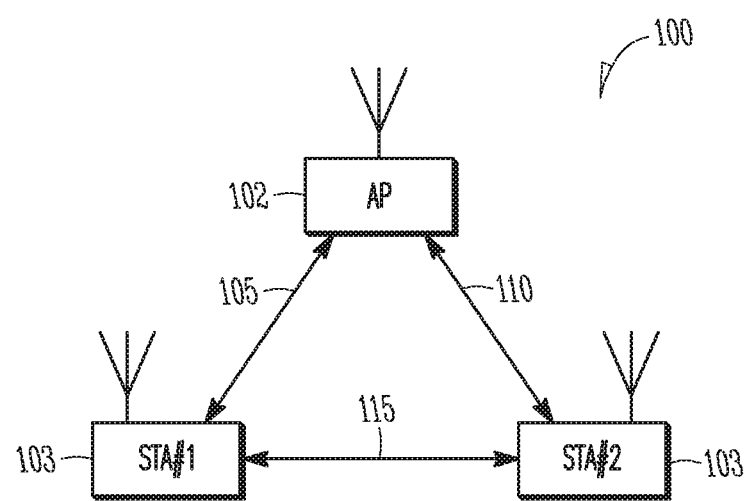
FIG. 1 illustrates a wireless network in accordance with some embodiments.

FIG. 1 illustrates a wireless network in accordance with some embodiments. In some embodiments, the network 100 may be a Wireless Local Area Network (WLAN) or a Wi-Fi network, although the scope of embodiments is not limited in this respect. It should be noted that embodiments are not limited to the number or type of components shown in the example network 100. Embodiments are also not limited by the example network 100 in terms of the arrangement of the components or the connectivity between components as shown. In addition, some embodiments may include additional components.

The example network 100 may include one or more access points (APs) 102 and one or more stations (STAs) 103. In some embodiments, the AP 102 may be arranged to operate in accordance with one or more IEEE 802.11 standards. These embodiments are not limiting, however, as other base station components, which may or may not be arranged to operate in accordance with a standard, may be used in some embodiments. As an example, an Evolved Node-B (eNB) arranged to operate in accordance with one or more Third Generation Partnership Project (3GPP) standards, including but not limited to 3GPP Long Term Evolution (LTE) standards, may be used in some cases. In some embodiments, the STAs 103 may be arranged to operate in accordance with one or more IEEE 802.11 standards. These embodiments are not limiting, however, as other mobile devices, portable devices and/or other devices, which may or may not be arranged to operate in accordance with a standard, may be used in some embodiments. As an example, a User Equipment (UE) arranged to operate in accordance with one or more Third Generation Partnership Project (3GPP) standards, including but not limited to 3GPP LTE standards, may be used in some cases.

In some embodiments, the STAs 103 may be configured to communicate with the AP 102 and/or with other STAs 103. As shown in the example network 100 in FIG. 1, STA #1 may communicate with the AP 102 over the wireless link 105 and STA #2 may communicate with the AP 102 over the wireless link 110. In some embodiments, direct communication between STAs 103 may be possible, such as over the wireless link 115 between STA #1 and STA #2. These embodiments are not limiting, however, as the direct communication between STAs 103 may not necessarily be possible in some embodiments.

In some embodiments, the communication between the AP 102 and the STAs 103 and/or the communication between the STAs 103 may be performed in accordance with one or more standards, such as an 802.11 standard (including legacy 802.11 standards), a 3GPP standard (including 3GPP LTE standards) and/or other standards. These embodiments are not limiting, however, as other communication techniques and/or protocols, which may or may not be included in a standard, may be used for the communication between the AP 102 and the STAs 103 and/or the communication between the STAs 103, in some embodiments.

In accordance with some embodiments, the AP 102 may transmit one or more downlink frames to the STA 103 in accordance with a downlink frame format. These embodiments will be described in more detail below.

It should be noted that the STAs 103, the AP 102, mobile devices, base stations and/or other devices may be configured to operate in various frequency bands, including but not limited to millimeter wave (mmWave), ultra high frequency (UHF), microwave and/or other frequency bands. In some cases, phase noise levels of receiver components, such as oscillators and PLLs and/or others, may affect receiver performance. Such phase noise levels may be significantly higher, in some cases, for operation in mmWave frequency bands in comparison to operation in other frequency bands. For instance, traditional wireless systems may operate in the UHF and microwave frequency bands, in some cases. Accordingly, techniques and/or operations that address receiver phase noise may be more challenging for systems operating in the mmWave frequency bands.

In some embodiments, the STAs 103, AP 102, other mobile devices, other base stations and/or other devices may be configured to perform operations related to contention based communication. As an example, the communication between the STAs 103 and/or AP 102 and/or the communication between the STAs 103 may be performed in accordance with contention based techniques. In such cases, the STAs 103 and/or AP 102 may be arranged to contend for a wireless medium (e.g., during a contention period) to receive exclusive control of the medium for a transmission period. For instance, the transmission period may include a transmission opportunity (TXOP), which may be included in an 802.11 standard and/or other standard.

It should be noted that embodiments are not limited to usage of contention based techniques, however, as some communication (such as that between mobile devices and/or communication between a mobile device and a base station) may be performed in accordance with schedule based techniques. Some embodiments may include a combination of contention based techniques and schedule based techniques.

In some embodiments, the communication between mobile devices and/or between a mobile device and a base station may be performed in accordance with single carrier techniques. As an example, a protocol data unit (PDU) and/or other data frame may be modulated on a single carrier frequency in accordance with a single carrier modulation (SCM) technique.

In some embodiments, the communication between mobile devices and/or between a mobile device and a base station may be performed in accordance with any suitable multiple-access techniques and/or multiplexing techniques. Accordingly, one or more of orthogonal frequency division multiple access (OFDMA), orthogonal frequency division multiplexing (OFDM), code-division multiple access (CDMA), time-division multiple access (TDMA), frequency division multiplexing (FDMA), space-division multiple access (SDMA), multiple-input multiple-output (MIMO), multi-user (MU) multiple-input multiple-output (MIMO) (MU-MIMO) and/or other techniques may be employed in some embodiments.

In some embodiments, channels used for communication between STAs 103 and/or APs 102 may be 2.16 GHz, 4.32 GHz, 6.48 GHz, 8.72 GHz and/or other suitable value. In some embodiments, channels used for communication between STAs 103 and/or APs 102 may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel may be configured for transmitting a number of spatial streams. The values given above may be part of an 802.11 standard, in some cases, although embodiments are not limited as such. For instance, a 2.16 GHz channel may be used in accordance with an 802.11 ad standard, and any of 2.16, 4.32, 6.48 or 8.72 GHz may be used in accordance with a channel bonding technique of an 802.11ay standard. These embodiments are not limiting, however, as other suitable bandwidths may be used in some embodiments. In addition, embodiments are not limited to channel types or channel sizes that are included in a standard.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
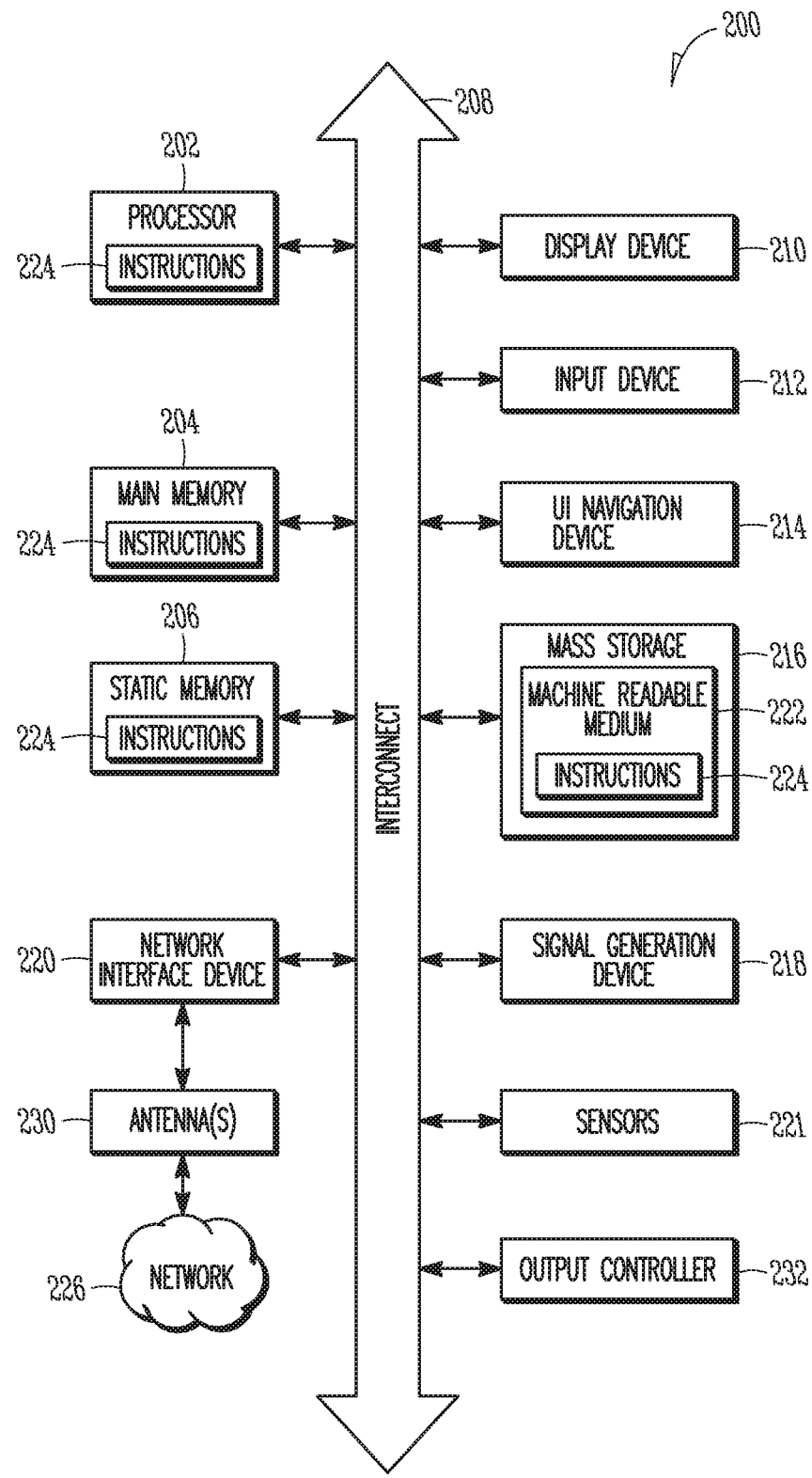
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
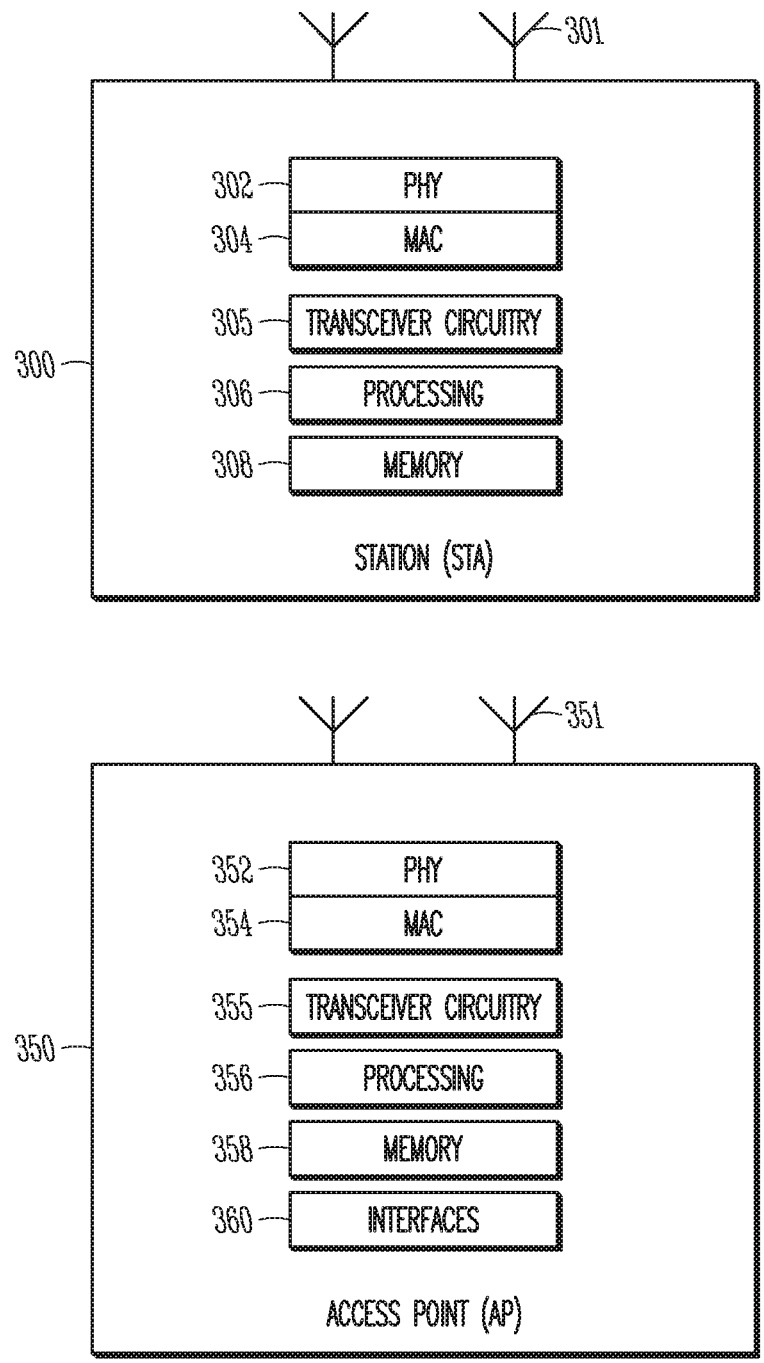
FIG. 3 illustrates a station (STA) and an access point (AP) in accordance with some embodiments.

FIG. 3 illustrates a station (STA) and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In some embodiments, the STA 300, AP 350, mobile device and/or base station may communicate using SCM signals transmitted over a single carrier communication channel. In some embodiments, the STA 300, AP 350, mobile device and/or base station may communicate using OFDM communication signals transmitted over a multicarrier communication channel. Accordingly, in some cases the STA 300, AP 350, mobile device and/or base station may be configured to receive signals in accordance with specific communication standards, such as the Institute of Electrical and Electronics Engineers (IEEE) standards including IEEE 802.11-2012, 802.11n-2009 and/or 802.11 ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the STA 300, AP 350, mobile device and/or base station may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation and/or single carrier frequency-division multiplexing (SC-FDM) although the scope of the embodiments is not limited in this respect.

In accordance with some embodiments, the STA 103 may determine, based at least partly on a training portion of a received protocol data unit (PDU), operational parameters including a signal quality metric and a carrier frequency offset (CFO) measurement. The STA 103 may decode a data portion of the PDU, the data portion comprising data symbols time-multiplexed with pilot symbols. The STA 103 may compare the signal quality metric to a predetermined signal quality threshold and compare the CFO measurement to a predetermined CFO threshold. If the signal quality metric is greater than or equal to the signal quality threshold and the CFO measurement is less than the CFO threshold, the STA 103 may decode the data portion using phase noise estimates of the pilot symbols. If the signal quality metric is less than the signal quality threshold or the CFO measurement is greater than or equal to the CFO threshold, the STA 103 may refrain from usage of the phase noise estimates of the pilot symbols to decode the data portion. These embodiments will be described in more detail below.

Figure 4:
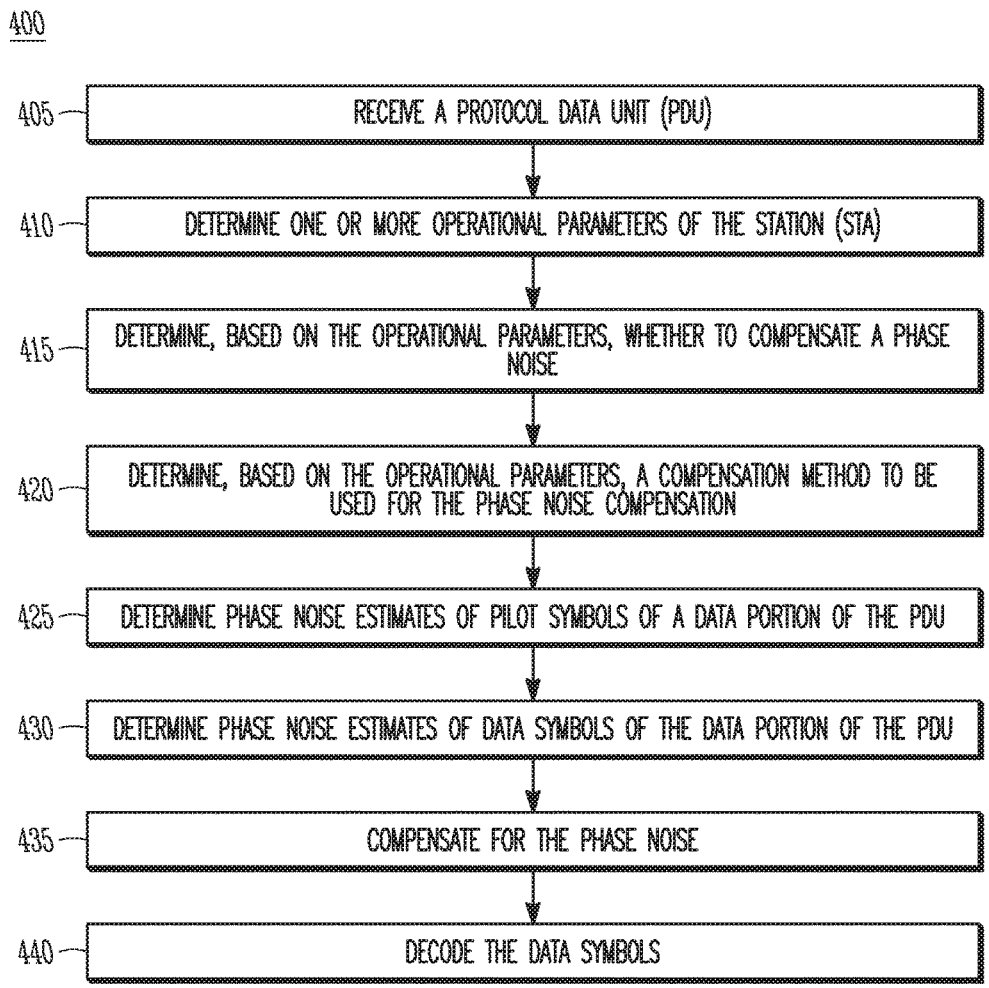
FIG. 4 illustrates the operation of a method of communication in accordance with some embodiments.

FIG. 4 illustrates the operation of a method of communication in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-9, although it is understood that the method 400 may be practiced with any other suitable systems, interfaces and components.

In addition, the method 400 and other methods described herein may refer to STAs 103 and/or APs 102 operating in accordance with one or more standards and/or protocols, such as 802.11, Wi-Fi, wireless local area network (WLAN) and/or other, but embodiments of those methods are not limited to just those devices. In some embodiments, the method 400 and other methods described herein may be practiced by other mobile devices, such as an HEW STA, an HEW AP, an Evolved Node-B (eNB) or User Equipment (UE). The method 400 and other methods described herein may also be practiced by wireless devices configured to operate in other suitable types of wireless communication systems, including systems configured to operate according to various Third Generation Partnership Project (3GPP) Long Term Evolution (LTE) standards. The method 400 may also be applicable to an apparatus for an STA 103 and/or AP 102 or other device described above, in some embodiments.

In some embodiments, communication between the STA 103 and an AP 102 may be performed in millimeter wave (mmWave) frequency bands. These embodiments are not limiting, however, as other frequency bands, including but not limited to ultra-high frequency (UHF) and/or microwave frequency bands, may be used in some embodiments.

In some embodiments, the method 400 may be practiced by an STA 103 and/or other mobile device and may include reception of downlink signals, downlink PDUs, downlink frames and/or other elements. It is understood, however, that methods practiced by an AP 102 and/or other base station component may include one or more operations that are similar to or the same as operations described for the method 400. Such methods may include reception of uplink signals, uplink PDUs, uplink frames and/or other elements, in some embodiment.

At operation 405 of the method 400, the STA 103 may receive a PDU. In some embodiments, the PDU may be received from the AP 102. The scope of embodiments is not limited in this respect, however, as the STA 103 may receive the PDU from another device, such as another STA 103, in some embodiments. Accordingly, one or more operations described herein related to PDUs received from the AP 102 may be applicable to PDUs (and/or other types of data frames) received from any suitable device.

In some embodiments, the PDU may be modulated on a single carrier frequency in accordance with a single carrier modulation (SCM) format. Embodiments are not limited to SCM formats, however. In addition, the single carrier may be included in a millimeter wave (mmWave) frequency range, in some embodiments. The scope of embodiments is not limited in this respect, however, as any suitable frequency range may be used.

Figure 5:
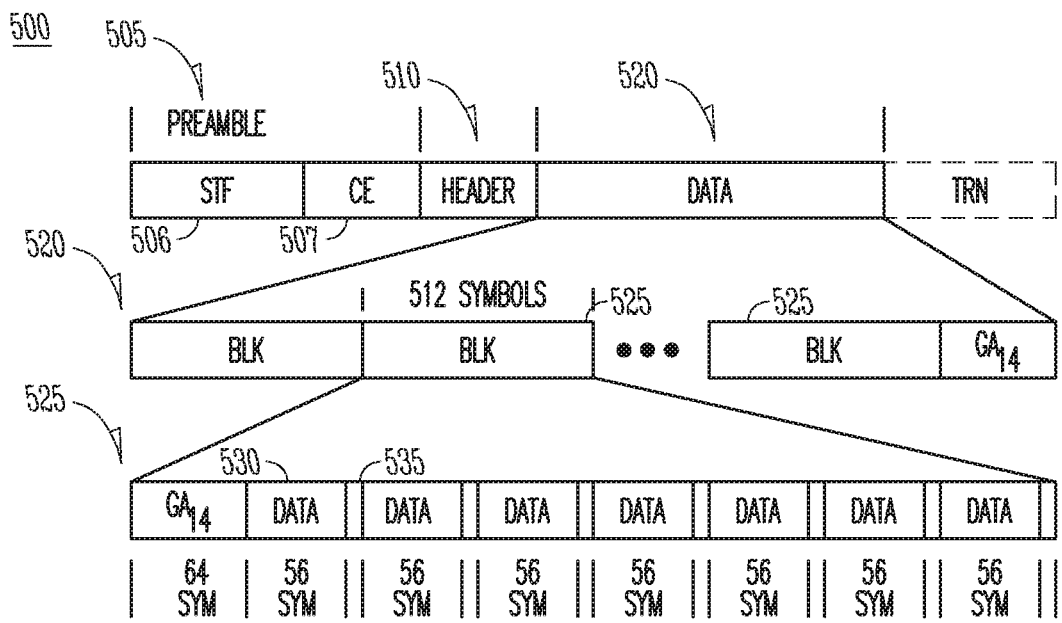
FIG. 5 illustrates an example protocol data unit (PDU) format in accordance with some embodiments.

FIG. 5 illustrates an example protocol data unit (PDU) format in accordance with some embodiments. It should be noted that the example PDU 500 shown in FIG. 5 may illustrate some or all of the concepts and techniques described herein, but embodiments are not limited by the example PDU 500. For instance, embodiments are not limited by the number, type, arrangement and/or other aspects of the example PDU 500. In some embodiments, additional fields may be included. In some embodiments, all fields shown in the example PDU 500 may not necessarily be included.

In addition, embodiments are also not limited to the number of pilot symbols, number of data symbols and/or ratios of pilot symbols to data symbols as shown in the example PDU 500. It should also be noted that descriptions herein of some concepts, methods, operations and/or techniques may refer to usage of a PDU, but the scope of embodiments is not limited in this respect, as any suitable type of frame (data frame, control frame and/or other) may be used.

In addition, the example PDU 500 may multiplex data symbols and pilot symbols in time resources, but embodiments are not limited to multiplexing in time, as frequency multiplexing (such as in OFDM) may be used in some embodiments. In some embodiments, SCM techniques may be used in the example PDU 500 shown in FIG. 5, although embodiments are not limited as such. The example PDU 500 may be included in a standard (such as IEEE 802.11ad, IEEE 802.11ay and/or other) in some cases, but embodiments are not limited to usage of formats that are included in a standard.

Referring to FIG. 5, the PDU 500 may include a short training field (STF) 506 and/or a channel estimation (CE) field 507. Such fields may include or may be based on predetermined and/or known bits, symbols, templates and/or patterns, which may be known (and/or may be determined) by both the STA 103 and the AP 102. Accordingly, various parameters and/or information may be determined by the receiving entity (such as the STA 103 in the method 400), examples of which will be described below. In some embodiments, the STF 506 and the CE field 507 may be part of a preamble 505, although the scope of embodiments is not limited in this respect. In some embodiments, the STF 506 and the CE field 507 may be part of a training portion of the PDU 500, although the scope of embodiments is not limited in this respect. The PDU 500 may also include a header 510.

The PDU 500 may include a data portion 520, which may include one or more data blocks 525, as shown in FIG. 5. As a non-limiting example, a data block 525 may include one or more contiguous blocks of data symbols (such as 530) and one or more contiguous blocks of pilot symbols (such as 535). The blocks of data symbols 530 and pilot symbols 535 are interleaved in time in the example of FIG. 5, although embodiments are not limited to interleaving arrangements. Embodiments are also not limited to this particular interleaving arrangement. In this example, 56 data symbols are included in the blocks of data symbols 530 and 8 pilot symbols are included in the blocks of pilot symbols 535.

At operation 410, the STA 103 may determine one or more operational parameters. Any suitable operational parameters may be used, including but not limited to one or more of the following example parameters.

As an example, a signal quality metric may be determined. For instance, a signal-to-noise ratio (SNR), a received signal strength indicator (RSSI), signal-to-interference-plus-noise ratio (SINR), channel quality indicator (CQI) and/or other suitable parameter may be determined. The signal quality metric may be determined based at least partly on a channel estimation (CE) field of the PDU (such as the CE field 507 of the PDU 500 in FIG. 5), although the scope of embodiments is not limited in this respect. In some embodiments, the current PDU may be used to determine the signal quality metric. In some embodiments, one or more previously received PDUs may be used to determine the signal quality metric, in addition to or instead of the current PDU. For instance, an average signal quality metric over multiple PDUs (which may or may not include the current PDU received at operation 405) may be determined. In some cases, a signal quality metric over a window of PDUs may be determined, and may be used as part of operations (such as decoding and/or other) on other PDUs outside of the window.

As another example, a carrier frequency offset (CFO) measurement may be determined. For instance, a residual CFO may be related to or may cause a linear variation of a receiver phase with respect to time. The variation may result from receiver components, including but not limited to oscillators, down-conversion mixers, up-conversion mixers and/or other components. In some cases, the residual CFO and/or the phase variation caused by the CFO may be independent of the received signal. It should be noted that embodiments are not limited to residual CFO measurements, as other types of CFO measurements may be used.

Continuing the previous example, the CFO measurement may be determined based at least partly on an STF of the PDU (such as the STF field 506 of the PDU 500 in FIG. 5), although the scope of embodiments is not limited in this respect. In some embodiments, the CFO measurement may be based on a phase variation in time during the STF of the PDU. For instance, multiple estimates of a residual phase at different times during the STF may be used as part of a linear regression with respect to time to determine an estimate of the residual CFO. The residual phase may be determined based on phases of the received PDU at the different times of the STF and the known phases of transmitted symbols of the STF at those times. For instance, a residual phase may be determined as a difference between a received phase and a transmitted phase.

In some embodiments, the current PDU may be used to determine the CFO measurement. In some embodiments, one or more previously received PDUs may be used to determine the CFO measurement, in addition to or instead of the current PDU. For instance, an average CFO measurement over multiple PDUs (which may or may not include the current PDU received at operation 405) may be determined. In some cases, a CFO measurement over a window of PDUs may be determined, and may be used as part of operations (such as decoding and/or other) on other PDUs outside of the window.

As another example of an operating parameter, a modulation and coding scheme (MCS) level may be used for one or more operations described herein. As an example, the MCS may be signaled in a header field and/or other field of the PDU. As another example, the MCS may be signaled by control message(s) received at the STA 103. These examples are not limiting, however, as the MCS may be determined using any suitable technique.

The MCS may be related to a modulation type used for the data symbols of the data portion and/or a forward error correction (FEC) coding rate. For instance, the modulation type may be binary phase-shift keying (BPSK), quadrature phase-shift keying (QPSK), quadrature amplitude modulation (QAM) and/or other. For QAM modulation, a size of a signal constellation from which the symbols are selected may include 16, 64 and/or other suitable number. The coding rate may be a ratio of information bits to coded bits for an encoder (which may be prior to a bit-to-symbol operation). Values such as 1/4, 1/3, 1/2, 2/3 and/or other rate may be used. In some embodiments, an MCS may be based on both a modulation type and a coding rate, such as 1/2 rate BPSK, 2/3 rate 64-QAM and/or other.

At operation 415, the STA 103 may determine, based at least partly on one or more operational parameters, whether to compensate a phase noise of the data symbols of the data portion of the PDU. A non-limiting example will be described below. In some embodiments, the phase noise may be generated by one or more components of the STA 103 and/or combination of such components. As non-limiting examples, phase noise may be generated at the STA 103 by an oscillator for up-conversion of signals, an oscillator for down-conversion of signals, a component or group of components that generate clock signals and/or sinusoidal signals, a receiver block, a transmitter block and/or other component or group of components.

In some embodiments, the phase noise compensation may be performed on the data symbols as part of a decode operation, although the scope of embodiments is not limited in this respect. For instance, a phase (such as a residual phase or other) for some or all of the data symbols may be determined/estimated. In some embodiments, phase noise estimates of the data symbols may be based at least partly on phase noise estimates of the pilot symbols, examples of which will be described below. The estimated phase may be compensated as part of decoding, demodulation and/or other operation. For instance, the data symbols may be compensated by phase noise estimates to generate an input to a slicer/demodulator, a soft metric for input to a convolutional decoder and/or other. As a non-limiting example of phase noise compensation, a multiplication by $\exp(-j*x)$ may be performed on a particular data symbol for which the estimated phase is x. This example of phase compensation is not limiting, as any suitable technique may be used.

As an example, the STA 103 may determine, based at least partly on the signal quality metric and the CFO estimation, whether to compensate the phase noise of the data symbols. The STA 103 may compare the signal quality metric to a predetermined signal quality threshold and compare the CFO measurement to a predetermined CFO threshold. If the signal quality metric is greater than or equal to the predetermined signal quality threshold and the CFO measurement is less than the predetermined CFO threshold, the STA 103 may compensate the phase noise of the data symbols to decode the data portion (and/or to decode data symbols of the data portion). In some cases, if the signal quality metric is less than the signal quality threshold or the CFO measurement is greater than or equal to the CFO threshold, the STA 103 may refrain from compensation of the phase noise of the data symbols to decode the data portion (and/or to decode data symbols of the data portion).

It should be noted that some embodiments may be described herein in terms of one or more logical operators, such as greater than or equal to, greater than, less than or equal to, less than, equal to or other. Different cases may be determined or may occur based on different logical combinations and/or comparisons. Embodiments are not limited to logical operators used herein for such combinations and/or comparisons, as any suitable combinations and/or comparisons may be used. As a non-limiting example, in some embodiments, a first case may occur (and a first group of one or more operations may be performed) when the signal quality metric is greater than or equal to a threshold and a second case may occur (and a second group of one or more operations may be performed) when the signal quality metric is less than the threshold. In other embodiments, the first case may occur (and the first group of one or more operations may be performed) when the signal quality metric is greater than the threshold and a second case may occur (and the second group of one or more operations may be performed) when the signal quality metric is less than or equal to the threshold.

One or more of the thresholds may be numerical, and may be given in any suitable units, including but not limited to scalar units, ratios, a number of bits, decibel (dB) units and/or other. As an example, an SNR may threshold may be given in dB units. As another example, a CFO threshold may be given in terms of Hz, kHz or other. In some cases, one or more of the thresholds may be categorical, and may be given in any suitable units, such as high/low, good/bad and/or other.

In some embodiments, the thresholds may be predetermined based on an expected performance and/or determined performance. Such performance may be based on one or more of simulation, analysis, laboratory experimentation and/or other suitable techniques. For instance, the signal quality threshold and the residual CFO threshold may be based on values at which an expected estimation error of the phase noise estimates of the data symbols is above a predetermined estimation error threshold. Accordingly, usage of the phase noise compensation as part of a decode operation in such cases may degrade performance in comparison to a decode operation in which the phase noise compensation is not used (refrained from). As an example, if the signal quality is too low, the resulting phase noise estimates may be noisy. As another example, if a residual CFO is too high, interpolation of the phase noise estimation across multiple time periods may be inaccurate, and resulting phase noise estimates may be noisy. In some cases, compensation by the noisy estimates may add additional noise that may degrade decoding performance by an amount that outweighs a potential benefit of using the phase noise compensation. Accordingly, in such cases, it may be better to refrain from usage of the phase noise compensation as part of the decode operation.

In some embodiments, the PDU may be formatted in accordance with a SCM technique, in which case data portions and pilot portions of the candidate downlink frame formats may be multiplexed in time resources of the candidate downlink frame formats. As an example, a pilot portion may be followed in time by a data portion. As another example, multiple pilot portions may be interleaved in time with multiple data portions. In some embodiments, the PDU may be formatted in accordance with an OFDM technique, in which case data portions and pilot portions of the candidate downlink frame formats may be multiplexed in frequency resources of the candidate downlink frame formats. It should be noted that embodiments are not limited to usage of SCM signals or OFDM signals. In some embodiments, the pilot symbols may generally be known and/or determinable by both the AP 102 and the STA 103, and may be used for operations such as phase noise compensation, phase noise tracking, channel estimation, detection and/or others.

It should be noted that embodiments are not limited to usage of the signal quality metric and the CFO measurement to determine whether to use phase noise compensation of the data symbols, as other combinations of these criteria and/or other criteria may be used. In some embodiments, one or more of signal quality metric, the CFO measurement, the MCS of the data symbols and/or other criteria may be used to determine whether or not to use the phase noise compensation of the data symbols.

As an example, the signal quality metric may be used without the CFO measurement. The STA 103 may compare the signal quality metric to a predetermined signal quality threshold. The STA 103 may determine that the phase noise compensation is to be used if the signal quality metric is less than the signal quality threshold. The STA 103 may determine to refrain from usage of the phase noise compensation if the signal quality metric is greater than or equal to the signal quality threshold. As another example, the CFO measurement may be used without the signal quality metric. The STA 103 may compare the CFO measurement to a predetermined CFO threshold. The STA 103 may determine that the phase noise compensation is to be used if the CFO measurement is less than the CFO threshold. The STA 103 may determine to refrain from usage of the phase noise compensation if the CFO measurement is greater than or equal to the CFO threshold. As another example, the MCS may be used in addition to or instead of the signal quality metric and the CFO measurement. For instance, when the MCS is high (relatively high number of information bits mapped to each data symbol and/or relatively high coding rate), the decoding of the data symbols may benefit from the phase noise compensation of the data symbols. Accordingly, the MCS may be used, by itself or in combination with one or more other parameters, to determine whether to use the phase noise compensation of the data symbols. An example of a high MCS may be 64-QAM modulation with a coding rate of 2/3 and an example of a low MCS may be BPSK modulation with a coding rate of 1/2. These examples of high MCS and low MCS are not limiting, as any suitable criteria for the MCS, modulation type and/or coding rate may be used to determine whether to use the phase noise compensation.

Returning to the method 400, at operation 420, the STA 103 may determine, based at least party on the operational parameters, a compensation method to be used for the phase noise compensation of the data symbols. A non-limiting example of a compensation method will be described below, in which phase noise estimates of pilot symbols are interpolated (or otherwise used) to determine phase noise estimates of data symbols, which may be applied to received values of the data symbols. Although interpolation-based methods are described herein, embodiments are not limited to usage of interpolation as part of the phase noise compensation.

In some embodiments, the one or more operational parameters may be compared to one or more thresholds to determine the compensation method to be used. In a non-limiting example, the one or more operational parameters may be compared to one or more thresholds to determine an interpolation method to be used. The operational parameter(s) used for operation 420 may be the same as those used for operation 415, in some cases, although the scope of embodiments is not limited in this respect. In some cases, one or more additional or alternate operational parameters may be used for operation 420, in addition to or instead of one or more parameters that are used at operation 415. As a non-limiting example, the signal quality metric and the CFO measurement may be used at operation 415 to determine whether or not the phase noise compensation is to be used, and the MCS of the data symbols may be used at operation 420 to determine a type of interpolation to be used. As another non-limiting example, the signal quality metric and the CFO measurement may be used at operation 415 to determine whether or not the phase noise compensation is to be used, and the signal quality metric, the CFO measurement, and the MCS of the data symbols may be used at operation 420 to determine a type of interpolation to be used.

In another non-limiting example, the signal quality threshold used at operation 415 may be a first signal quality threshold. If the signal quality metric is greater than or equal to the first signal quality threshold and the CFO measurement is less than the CFO threshold, the STA 103 may determine a type of interpolation weights for the interpolation of the phase noise estimates based at least partly on a comparison between the signal quality metric and a second signal quality threshold that is greater than the first signal quality threshold. If the signal quality metric is greater than or equal to the first signal quality threshold and less than the second signal quality threshold, the interpolation weights may be linear weights inversely related to time differences between symbol locations of the data symbols and the pilot symbols. If the signal quality metric is greater than or equal to the second signal quality threshold, the interpolation weights may be non-linear weights that are based on an expected phase noise variation in time. It should be noted that embodiments are not limited to a first and second threshold, as any suitable number of thresholds may be used in comparisons between operational parameters (such as the signal quality metric and/or other parameter) and thresholds. In addition, the linear and non-linear interpolation will be described in more detail below. It should also be noted that embodiments are not limited to linear or non-linear interpolation, as other types of compensation methods may be used, in addition to or instead of linear or non-linear interpolation.

In another non-limiting example, if the signal quality metric (used at operation 415) is greater than or equal to the signal quality threshold and the CFO measurement is less than the CFO threshold, the STA 103 may determine a type of interpolation weights for the interpolation of the phase noise estimates based at least partly on a modulation size of a symbol constellation for the data symbols. In some embodiments, if the modulation size is equal to or less than a predetermined modulation size threshold, the interpolation weights may be linear weights inversely related to time differences between symbol locations of the data symbols and the pilot symbols. If the modulation size is greater than the modulation size threshold, the interpolation weights may be non-linear weights that are based on an expected phase noise variation in time. As a non-limiting example, a value of 4 may be used for the modulation size threshold. If the modulation size is 4 or less (such as QPSK or BPSK), the interpolation weights may be linear weights inversely related to time differences between symbol locations of the data symbols and the pilot symbols. If the modulation size is greater than 4 (such as 16-QAM, 64-QAM or other), the interpolation weights may be non-linear weights that are based on an expected phase noise variation in time. It should be noted that embodiments are not limited to the usage of 4 as the modulation size threshold. For instance, any suitable modulation size threshold (2, 4, 8, 16, 32, 64 or other) may be used to determine the type of interpolation weights (linear or non-linear or other) to be used.

At operation 425, the STA 103 may determine phase noise estimates of the pilot symbols of the data portion of the PDU. At operation 430, the STA 103 may determine phase noise estimates of the data symbols of the data portion of the PDU. In some embodiments, the phase noise estimates of the data symbols may be based on phase noise estimates of the pilot symbols, such as via interpolation and/or other technique. At operation 435, the phase noise compensation of the data symbols may be performed. For instance, when it is determined that the phase noise compensation is to be performed, the STA 103 may perform operation 435. The STA 103 may refrain from the phase noise compensation of operation 435, however, when it is determined that the phase noise compensation is not to be performed. At operation 440, the data portion of the PDU may be decoded. For instance, the data symbols of the data portion may be decoded.

In some embodiments, if the signal quality metric is greater than or equal to the signal quality threshold and the CFO measurement is less than the CFO threshold, the STA 103 may determine the phase noise estimates of the pilot symbols based on received values of the pilot symbols (such as a difference between a received phase and a transmitted phase), may interpolate the phase noise estimates of the pilot symbols to generate phase noise estimates of the data symbols, and may scale the data symbols based on the phase noise estimates of the data symbols to compensate the phase noise of the data symbols.

In some embodiments, the STA 103 may refrain from one or more of operations 425 and 430 based on the operational parameters. For instance, if it is determined that phase noise compensation of the data symbols is not to be performed, the STA 103 may refrain from either or both of operations 425 and 430. However, the scope of embodiments is not limited in this respect. In some cases, the STA 103 may perform one or both of operations 425 and 430 even when the phase noise compensation is not to be used. In such cases, the STA 103 may perform the decode operation without usage of the phase noise compensation even if the phase noise estimates are determined. Accordingly, the STA 103 may refrain from performance of operation 435 in such cases.

Figure 6:
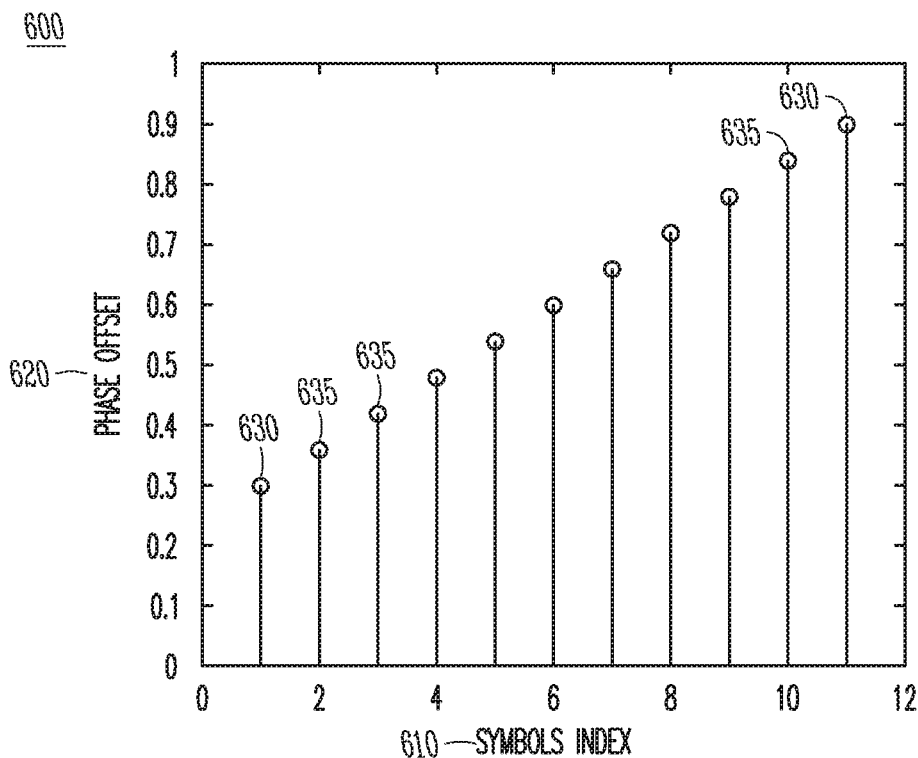
FIG. 6 illustrates an example of phase noise interpolation in accordance with some embodiments.

FIG. 6 illustrates an example of phase noise interpolation in accordance with some embodiments. It should be noted that the example shown in FIG. 6 may illustrate some or all of the concepts and techniques described herein, but embodiments are not limited by the example interpolation 600. For instance, embodiments are not limited by the number, type, arrangement and/or other aspects of the example interpolation 600. The technique shown in FIG. 6 may be extended to different arrangements in which more than two pilots are used and to different arrangements in terms of symbol spacing between pilots and/or other aspects.

In the example interpolation 600, the phase noise estimates 630 may be for pilot symbols (symbols #1 and #11 in this example), and the phase noise estimates 635 may be for data symbols (symbols #2-#10 in this example). As shown in FIG. 6, a linear interpolation may be used to interpolate the phase noise estimates 635 for the data symbols based on the phase noise estimates 630 for the pilot symbols. The pilot symbols are spaced by 10 symbols in this example. For instance, the phase noise estimate for symbol #2 may be determined by weighting the phase noise estimate at symbol #1 by 9/10 and the phase noise estimate at symbol #11 by 1/10. For symbol #X (X between 2 and 10), the weight for the phase noise estimate at symbol #1 may be (10−X)/10 and the weight for the phase noise estimate at symbol #11 may be (X−1)/10. It should be noted that the pilot (either symbol #1 or #11) that is closer to a particular data symbol is weighted higher than the other pilot.

For a non-linear interpolation, a different set of weights may be determined. The general tendency to weight closer pilots (in terms of time) by higher weights may still be maintained, in some cases. Techniques for determination of the non-linear weights may be based on minimization of an expected error of the phase noise estimate based on correlations with the pilot symbols from which the interpolation is performed (in this case, the two pilot symbols #1 and #11). As an example, the non-linear weights and/or the correlation used to determine the non-linear weights may be based on factors such as a power spectral density (PSD) of the phase noise and/or other characteristics of the phase noise. In some cases, such techniques may be based on simulation, analysis, laboratory experimentation or a combination thereof. It should also be noted that the above example and techniques may be extended to more than two pilot symbols.

Figure 7:
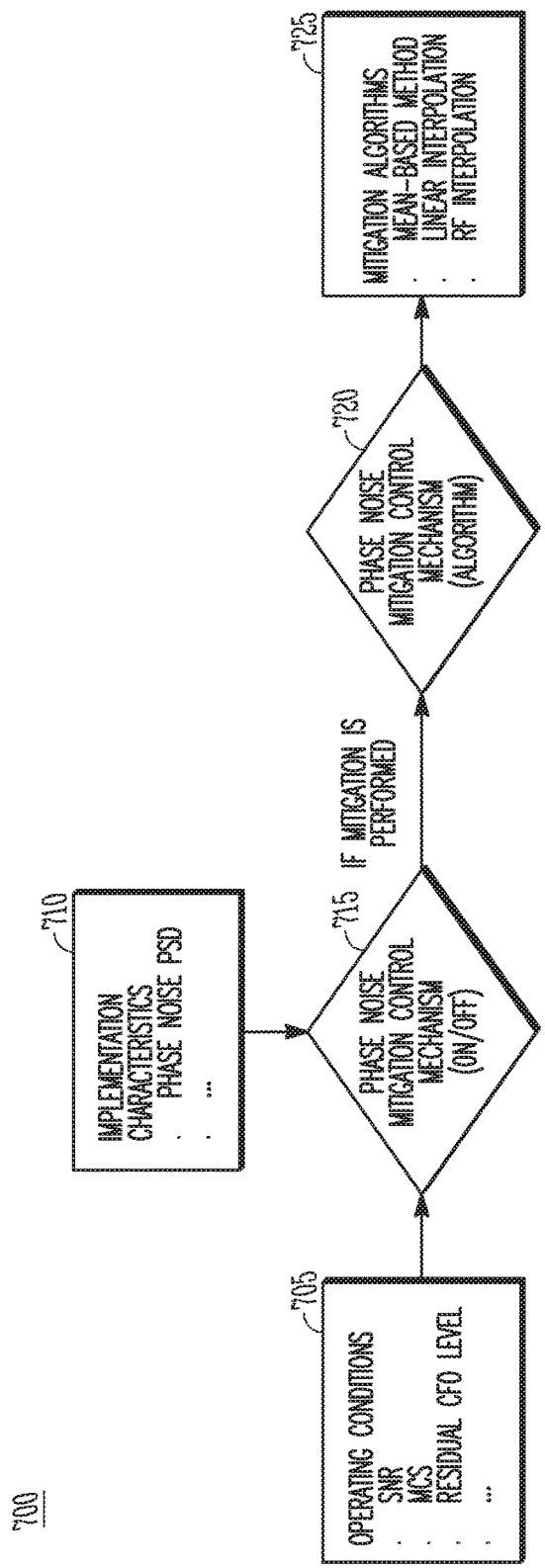
FIG. 7 illustrates an example block diagram of receiver operations in accordance with some embodiments.

FIG. 7 illustrates an example block diagram of receiver operations in accordance with some embodiments. The block diagram 700 may illustrate operations and/or decision logic that may be used in some embodiments, although the scope of embodiments is not limited by the operations or by the logic shown in diagram 700. One or more of the operating conditions 705 and/or implementation characteristics 710 may be used at block 715 to determine whether phase noise compensation (such as compensation of data symbols) is to be performed. If it is determined that the phase noise compensation is to be performed, a type of interpolation may be determined at operation 720. Non-limiting examples of phase noise mitigation algorithms that may be used are shown in block 725.

In some scenarios, including but not limited to communication systems operating in the millimeter-wave range, the phase noise level of the oscillator used, including a reference clock, a loop filter, and/or other PLL components, may be significantly higher than that of traditional wireless systems in the UHF and microwave bands. In some cases, an oscillator power spectral density (PSD) level may increase by approximately 20 dBc/Hz per decade with respect to an increase in carrier frequency. As a result, the performance of systems operating in the millimeter-wave range can be severely limited by phase noise, in some cases.

In some scenarios, baseband modems may use relatively weak phase noise mitigation mechanisms because phase noise may not necessarily be a dominating factor in low frequencies. In some cases, a mitigation mechanism may be based on tracking an average phase noise offset in pilot symbols (that is, estimating the mean value of the underlying phase noise realization).

In some embodiments, phase noise estimation/compensation may be performed by obtaining a mean/average of the phase noise measurements at pilots. This estimated average may be used as an estimation of a phase offset in the data symbols, and the data symbols may be compensated by this estimated average. This technique may be referred to as a mean-based method.

In some embodiments, linear interpolation may be used, in which phase noise estimates of data symbols may be obtained by linearly interpolating (in time) phase noise estimates of pilot symbols. In some embodiments, non-linear interpolation (such as RF interpolation) may be used, in which interpolation weights may be based on one or more factors such as predetermined and/or known characteristics of a PLL/VCO, operating conditions such as SNR and/or other factors.

In some embodiments, operating conditions, such as SNR and residual CFO level, determine whether receivers should or should not perform phase noise compensation. If compensation is performed, operating conditions may indicate which compensation algorithm should be used. As an example, in certain conditions—such as low SNR values and large values of residual CFO, usage of phase noise compensation may degrade performance. Accordingly, the STA 103 may refrain from phase noise compensation, in such cases. It may be difficult to reliable measure the phase noise, in this case, and phase noise may not even be a dominating performance factor anyway.

In some embodiments, the receiver may decide to perform or not perform phase noise compensation. If it is determined that compensation is to be performed, the receiver may decide which interpolation method to use, based on operating conditions such as SNR, MCS, PSD characteristics of the phase noise, residual CFO level and/or others. Accordingly, the receiver may track phase noise in time, based on the time-domain pilots; may determine if phase noise compensation is to be performed; and may determine the phase noise mitigation scheme is to be used. In this case, the phase noise mitigation may be performed if conditions are "favorable" (for example, when an operating SNR value is greater than or equal to a certain threshold and residual CFO is low). Different phase noise mitigation procedures may be used depending on operating conditions (such as SNR value and residual CFO level) and implementation-specific characteristics (PSD of phase noise, for example). For example, for low SNR values, a mean-based compensation may be used. For high SNR values, an interpolation-based compensation may be used. Other operating condition parameters, instead of or in addition to SNR and residual CFO level, may be used, such as the MCS of the received signal. As an example, decoding of a higher MCS may benefit from a better phase noise mitigation, in some cases, and therefore a procedure that may be more complex and may provide better performance may be used. For instance, RF interpolation may be used, in which a phase noise PSD may be used to determine interpolation.

Figure 8:
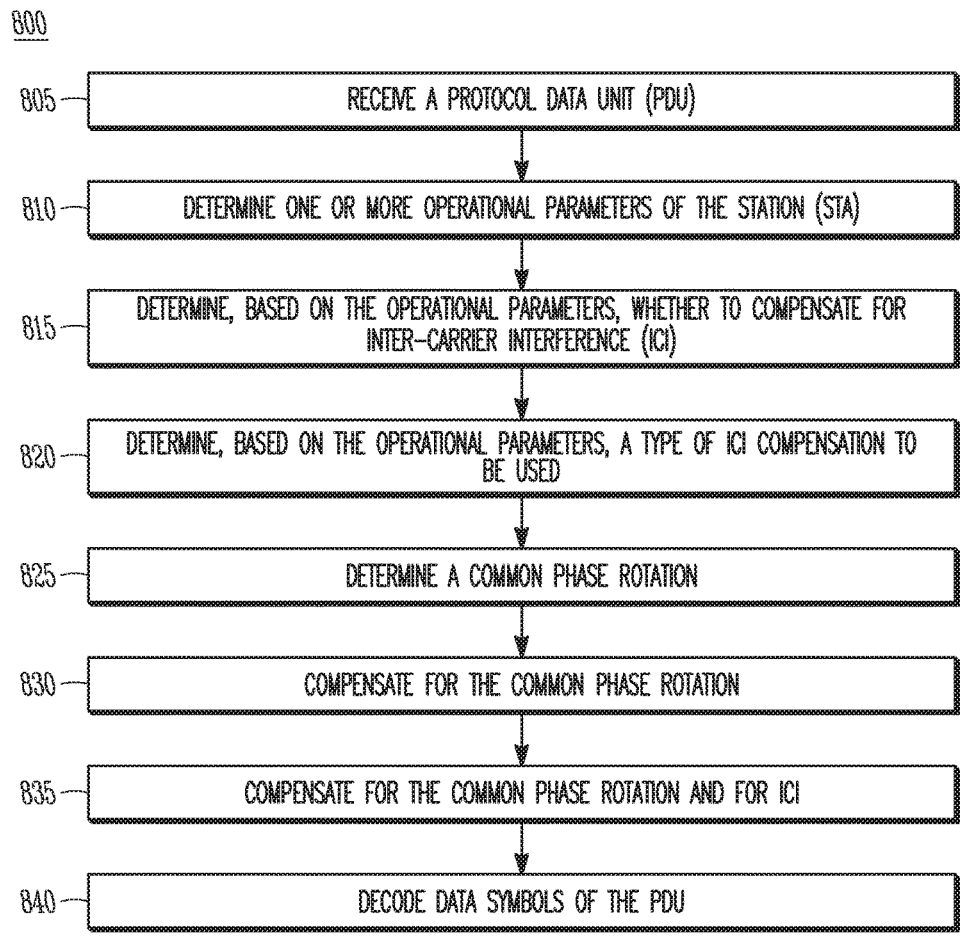
FIG. 8 illustrates the operation of another method of communication in accordance with some embodiments.

FIG. 8 illustrates the operation of another method of communication in accordance with some embodiments. As mentioned previously regarding the method 400, embodiments of the method 800 may include additional or even fewer operations or processes in comparison to what is illustrated in FIG. 8 and embodiments of the method 800 are not necessarily limited to the chronological order that is shown in FIG. 8. In describing the method 800, reference may be made to FIGS. 1-7 and 9, although it is understood that the method 800 may be practiced with any other suitable systems, interfaces and components. In addition, embodiments of the method 800 may be applicable to APs 102, STAs 103, UEs, eNBs or other wireless or mobile devices. The method 800 may also refer to an apparatus for an AP 102, STA 103 and/or other device described above.

It should be noted that one or more operations and/or techniques described as part of the method 400 may be relevant to the method 800. In some cases, an operation of the method 800 may be similar to or the same as an operation of the method 400, although the scope of embodiments is not limited in this respect. In addition, previous discussion of various techniques and concepts may be applicable to the method 800 in some cases, including operational parameters, signal quality measurements, CFO, CFO measurements, phase noise, phase noise compensation, phase noise tracking, PDU formats, pilot symbols, pilot portions, data symbols, data portions and/or others.

In some embodiments, the method 800 may be practiced by an STA 103 and/or other mobile device and may include reception of downlink signals, PDUs, frames and/or other elements. It is understood, however, that methods practiced by an AP 102 and/or other base station component may include one or more operations that are similar to or the same as operations described for the method 800. Such methods may include reception of downlink signals, PDUs, frames and/or other elements, in some embodiments.

At operation 805, the STA 103 may receive a PDU. The PDU may be received from an AP 102 in some embodiments. However, as described regarding the method 400, the PDU may be received from another STA 103 or other component, in some embodiments. In some embodiments, the PDU may be formatted in accordance with an orthogonal frequency division multiplexing (OFDM) format for which a data portion of resource units (RUs) is allocated for data symbols and a pilot portion of the RUs is allocated for pilot symbols. The scope of embodiments is not limited to OFDM formats, however, as any suitable format may be used.

At operation 810, one or more operational parameters may be determined. Any suitable parameters may be used, including but not limited to one or more of those described regarding the method 400. In some cases, additional or alternate parameters may be used at operation 810. In some embodiments, a signal quality metric based at least partly on a training portion of the PDU received at operation 805 may be determined. It should also be noted that the operational parameters may be based on a current PDU, one or more previously received PDUs or a combination thereof.

At operation 815, the STA 103 may determine whether to compensate for inter-carrier interference (ICI) between RUs of the data portion. The ICI may occur when received values of at least some of the RUs of the data portion are based at least partly on data symbols of adjacent RUs. Accordingly, the ICI may be based on a phase noise across the RUs that causes received values of the RUs to depend not only on a corresponding data symbol of the RU, but also on data symbol(s) of one or more adjacent RUs. In some embodiments, the STA 103 may determine whether to compensate for both a common phase rotation in the RUs and for ICI or to compensate for the common phase rotation in the RUs but not for ICI.

It should be noted that the ICI is an example of a frequency-dependent (RU dependent) phase noise for which compensation may be performed as described regarding operations of the method 800. Although reference is made to compensation of the ICI in some descriptions herein, embodiments are not limited to ICI. One or more of the operations related to ICI compensation may be applicable to other types of RU dependent (frequency dependent) noise and/or RU dependent (frequency dependent) interference, in some embodiments.

The ICI may be based on a phase noise across the RUs that causes received values of the RUs to depend not only on a corresponding data symbol of the RU, but also on data symbol(s) of one or more adjacent RUs. The ICI may be reduced by a compensation of frequency-dependent phase noise across RUs, in some cases. In contrast, a common phase rotation may be caused to all (or at least some) of the RUs. Accordingly, a compensation for the common phase rotation may not necessarily be frequency dependent, in some cases.

One or more operational parameters may be used as part of operation 815, although the scope of embodiments is not limited in this respect. As an example, the STA 103 may use comparisons of operational parameters with predetermined thresholds, in some cases, although any suitable techniques may be used. In some embodiments, if the signal quality metric is greater than or equal to a predetermined signal quality threshold, decoding of the data symbols may be performed in accordance with a compensation of the common phase rotation and a compensation of the ICI. If the signal quality metric is less than the signal quality threshold, the decoding of the data symbols may be performed in accordance with the compensation of the common phase rotation, but the STA 103 may refrain from the compensation of the ICI. Embodiments are not limited to this example in which the signal quality metric is used to decide whether to compensate for the ICI, as other parameters may be used, in addition to or instead of the signal quality metric.

At operation 820, the STA 103 may determine an ICI mitigation algorithm type based at least partly on the operational parameters. The determination may be based on one or more comparisons of operational parameter(s) with one or more thresholds, which may be predetermined. Techniques similar to those used in the method 400 for determination of an interpolation technique may be used in some embodiments. In some embodiments, operation 820 may be performed when it is determined, such as at operation 815, that ICI compensation is to be performed, although the scope of embodiments is not limited in this respect.

At operation 825, a common phase rotation of the RUs may be determined. In some embodiments, the common phase rotation may be determined based at least partly on the training portion of the received PDU. The common phase rotation may affect all RUs (or at least some of them) as a scale factor due to timing or other factors. In some embodiments, operation 825 may be performed when it is determined, such as at operation 815, that ICI compensation is to be performed, although the scope of embodiments is not limited in this respect.

At operation 830, the common phase rotation may be compensated. As a non-limiting example of compensation of the common phase rotation, a multiplication by $\exp(-j*x)$ may be performed on the RUs when the estimated common phase rotation is x. At operation 835, the STA 103 may compensate for the common phase rotation and for ICI. At operation 840, the STA 103 may decode the data symbols. In some embodiments, the data symbols may be decoded based on received values in the RUs of the data portion for which the common phase rotation and/or ICI has been compensated.

In some embodiments, the STA 103 may perform either of operation 830 or 835, but not both. In some embodiments, operation 830 may be performed when the STA 103 determines that compensation for both the common phase rotation in the RUs and the ICI is to be performed. Operation 835 may be performed when the STA 103 determines that compensation for the common phase rotation is to be performed but that compensation for the ICI is not to be performed.

In some embodiments, the compensation of the ICI may be performed using frequency domain equalization. As an example of frequency domain equalization, received values of the RUs of the data portion may be multiplied by an equalization matrix to generate equalized values for the RUs of the data portion. In some cases, the ICI may impair or distort a desired orthogonality between the RUs. The multiplication by the equalization matrix may restore, or attempt to restore, the orthogonality between the RUs. In some embodiments, the equalization matrix may be determined based on one or more factors, including but not limited to phase noise estimates of the pilot symbols, information about the phase noise (such as a power spectral density (PSD) or other characteristics of the phase noise), information about the ICI and/or other factors. In some cases, such information about the phase noise and/or ICI may be based on simulation, analysis, laboratory experimentation or a combination thereof.

As another example of frequency domain equalization, received values of the RUs of both the data portion and the pilot portion may be multiplied by an equalization matrix to generate equalized values for those RUs. It should be noted that embodiments are not limited to these example techniques for frequency domain equalization, as other types of frequency domain equalization may be used in some embodiments. In addition, embodiments are not limited to usage of frequency domain equalization to compensate for ICI, as other suitable methods of ICI compensation may be used in some embodiments.

Figure 9:
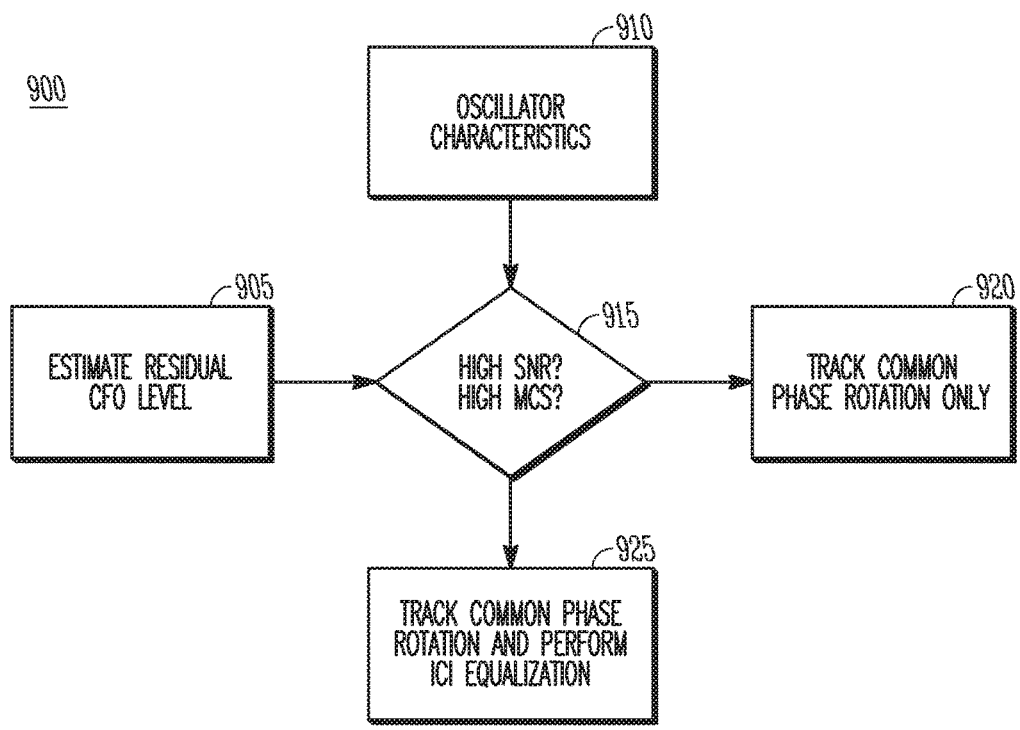
FIG. 9 illustrates another example block diagram of receiver operations in accordance with some embodiments.

FIG. 9 illustrates an example block diagram of receiver operations in accordance with some embodiments. The block diagram 900 may illustrate operations and/or decision logic that may be used in some embodiments, although the scope of embodiments is not limited by the operations or by the logic shown in diagram 900. One or more of a residual CFO level 905, oscillator characteristics 910, operational parameters 915 (such as a signal quality metric, MCS and/or other) and/or other parameter(s) may be used to determine whether different compensation techniques are to be performed. As an example, if the signal quality metric is high (such as greater than or equal to a first predetermined threshold) and if the MCS is high (such as a modulation size above a second predetermined threshold and/or a coding rate above a third predetermined threshold), the STA 103 may determine (as indicated by 925) that a common phase rotation is to be tracked and a compensation of ICI is to be performed. In this example, if the above condition is not met, the STA 103 may determine (as indicated by 920) that the common phase rotation is to be tracked and that the compensation of the ICI is not to be performed.

In some multi-carrier systems (including but not limited to OFDM), phase noise may appear in the frequency domain as (1) a common phase rotation to all subcarriers (proportional to the mean value of the phase noise during the OFDM symbol); and (2) inter-carrier interference (ICI) due to the variance of the phase noise during the OFDM symbol. Because it may be difficult to equalize ICI caused by phase noise, it may be better in some cases to track the common phase rotation but not the ICI. In some embodiments, an OFDM receiver may decide whether to both track the common phase error and perform ICI mitigation or to track the common phase error but to refrain from the ICI mitigation.

In Example 1, an apparatus of a wireless device may comprise memory. The apparatus may further comprise processing circuitry. The processing circuitry may be configured to determine, based at least partly on a training portion of a received protocol data unit (PDU), operational parameters including a signal quality metric and a carrier frequency offset (CFO) measurement. The PDU may comprise the training portion and a data portion comprising data symbols time-multiplexed with pilot symbols. The processing circuitry may be further configured to compare the signal quality metric to a predetermined signal quality threshold and compare the CFO measurement to a predetermined CFO threshold. The processing circuitry may be further configured to, if the signal quality metric is greater than or equal to the signal quality threshold and the CFO measurement is less than the CFO threshold, decode the data portion using phase noise estimates of the pilot symbols. The processing circuitry may be further configured to, if the signal quality metric is less than the signal quality threshold or the CFO measurement is greater than or equal to the CFO threshold, refrain from usage of the phase noise estimates of the pilot symbols to decode the data portion.

In Example 2, the subject matter of Example 1, wherein the PDU may be modulated on a millimeter wave signal in accordance with a single carrier modulation (SCM) scheme.

In Example 3, the subject matter of one or any combination of Examples 1-2, wherein the processing circuitry may be further configured to, when the phase noise estimates are used to decode the data portion: interpolate the phase noise estimates by a linear interpolation to generate phase noise estimates of the data symbols to decode the data portion if the signal quality metric is in a first range; and interpolate the phase noise estimates by a non-linear interpolation to generate the phase noise estimates of the data symbols to decode the data portion if the signal quality metric is in a second range that is higher than the first range.

In Example 4, the subject matter of one or any combination of Examples 1-3, wherein the processing circuitry may be further configured to, when the phase noise estimates are used to decode the data portion: interpolate the phase noise estimates by a linear interpolation to generate phase noise estimates of the data symbols to decode the data portion if the data symbols are modulated by binary phase shift keying (BPSK) or quadrature phase shift keying (QPSK); and interpolate the phase noise estimates by a non-linear interpolation to generate the phase noise estimates of the data symbols to decode the data portion if the data symbols are modulated by quadrature amplitude modulation (QAM).

In Example 5, the subject matter of one or any combination of Examples 1-4, wherein the processing circuitry may be further configured to, if the signal quality metric is greater than or equal to the signal quality threshold and the CFO measurement is less than the CFO threshold: determine the phase noise estimates of the pilot symbols based on received values of the pilot symbols; interpolate the phase noise estimates of the pilot symbols to generate phase noise estimates of the data symbols; and scale the data symbols based on the phase noise estimates of the data symbols to compensate the phase noise of the data symbols.

In Example 6, the subject matter of one or any combination of Examples 1-5, wherein the signal quality threshold may be a first signal quality threshold. The processing circuitry may be further configured to, if the signal quality metric is greater than or equal to the first signal quality threshold and the CFO measurement is less than the CFO threshold, determine a type of interpolation weights for the interpolation of the phase noise estimates based at least partly on a comparison between the signal quality metric and a second signal quality threshold that is greater than the first signal quality threshold. If the signal quality metric is greater than or equal to the first signal quality threshold and less than the second signal quality threshold, the interpolation weights may be linear weights inversely related to time differences between symbol locations of the data symbols and the pilot symbols. If the signal quality metric is greater than or equal to the second signal quality threshold, the interpolation weights may be non-linear weights that are based on an expected phase noise variation in time.

In Example 7, the subject matter of one or any combination of Examples 1-6, wherein the processing circuitry may be further configured to, if the signal quality metric is greater than or equal to the signal quality threshold and the CFO measurement is less than the CFO threshold, determine a type of interpolation weights for the interpolation of the phase noise estimates based at least partly on a modulation size of a symbol constellation for the data symbols. If the modulation size is equal to or less than a predetermined modulation size threshold, the interpolation weights may be linear weights inversely related to time differences between symbol locations of the data symbols and the pilot symbols. If the modulation size is greater than the modulation size threshold, the interpolation weights may be non-linear weights that are based on an expected phase noise variation in time.

In Example 8, the subject matter of one or any combination of Examples 1-7, wherein the signal quality metric may be in a group that includes a signal-to-noise ratio (SNR) or a received signal strength indicator (RSSI).

In Example 9, the subject matter of one or any combination of Examples 1-8, wherein the signal quality threshold and the residual CFO threshold may be based on values at which an expected estimation error of phase noise estimates of the data symbols is above a predetermined estimation error threshold, the phase noise estimates of the data symbols determined based on the phase noise estimates of the pilot symbols.

In Example 10, the subject matter of one or any combination of Examples 1-9, wherein the wireless device may be a station (STA) arranged to operate in accordance with a wireless local area network (WLAN) protocol to receive the PDU from an access point (AP).

In Example 11, the subject matter of one or any combination of Examples 1-10, wherein the data symbols may include multiple sub-groups of 56 contiguous data symbols, the pilot symbols may include multiple sub-groups of 8 contiguous pilot symbols, and the sub-groups of data symbols and the sub-groups of pilot symbols may be time-interleaved in the data portion of the PDU.

In Example 12, the subject matter of one or any combination of Examples 1-11, wherein the processing circuitry may be further configured to determine the signal quality metric based at least partly on a channel estimation (CE) field of the PDU. The processing circuitry may be further configured to determine the CFO measurement based at least partly on a phase variation in time during a short training field (STF) of the PDU.

In Example 13, the subject matter of one or any combination of Examples 1-12, wherein the processing circuitry may be further configured to determine the operational parameters based at least partly on a training portion of a previous PDU or a data portion of a previous PDU.

In Example 14, the subject matter of one or any combination of Examples 1-13, wherein the processing circuitry may include a baseband processor to determine the operational parameters and to decode the data portion.

In Example 15, the subject matter of one or any combination of Examples 1-14, wherein the apparatus may further comprise a transceiver to receive the PDU.

In Example 16, a non-transitory computer-readable storage medium may store instructions for execution by one or more processors to perform operations for communication by a wireless device. The operations may configure the one or more processors to determine a signal quality metric based at least partly on a channel estimation (CE) field of a protocol data unit (PDU) received from an access point (AP) and determine a carrier frequency offset (CFO) measurement based at least partly on a phase variation in time during a short training field (STF) of the PDU. The PDU may comprise the CE field, the STF field, and a data portion comprising data symbols time-multiplexed with pilot symbols. The operations may further configure the one or more processors to determine, based at least partly on the signal quality metric and the CFO estimation, whether to compensate phase noise of the data symbols. The operations may further configure the one or more processors to, if the signal quality metric is greater than or equal to a predetermined signal quality threshold and the CFO measurement is less than a predetermined CFO threshold: as part of the decode operation, compensate the phase noise of the data symbols based at least partly on phase noise estimates of the pilot symbols. The operations may further configure the one or more processors to, if the signal quality metric is less than the signal quality threshold or if the CFO measurement is greater than or equal to the CFO threshold, refrain from the phase noise compensation of the data symbols as part of the decode operation.

In Example 17, the subject matter of Example 16, wherein the signal quality may be in a group that includes a signal-to-noise ratio (SNR) or a received signal strength indicator (RSSI).

In Example 18, a method of decoding at a wireless device may comprise determining a signal quality metric based at least partly on a training portion of a protocol data unit (PDU). The PDU may be formatted in accordance with an orthogonal frequency division multiplexing (OFDM) format for which a data portion of resource units (RUs) is allocated for data symbols and a pilot portion of the RUs is allocated for pilot symbols. The method may further comprise determining a common phase rotation of the RUs based at least partly on the training portion of the received PDU. The method may further comprise, if the signal quality metric is greater than or equal to a predetermined signal quality threshold, decoding the data symbols in accordance with a compensation of the RUs of the data portion by the common phase rotation and further in accordance with a compensation of inter-carrier interference (ICI) by an equalization matrix. The method may further comprise, if the signal quality metric is less than the signal quality threshold, decoding the data symbols in accordance with the compensation by the common phase rotation and refraining from the compensation of the ICI by the equalization matrix.

In Example 19, the subject matter of Example 18, wherein the method may further comprise, when the data symbols are decoded in accordance with the compensation of the ICI, determining the equalization matrix based at least partly on phase noise estimates of the RUs of the pilot portion.

In Example 20, the subject matter of one or any combination of Examples 18-19, wherein the equalization matrix may be predetermined based at least partly on a power spectral density (PSD) of a phase noise at the wireless device.

In Example 21, the subject matter of one or any combination of Examples 18-20, wherein the ICI caused to at least some of the RUs of the data portion may be based on data symbols or pilot symbols of adjacent RUs.

In Example 22, the subject matter of one or any combination of Examples 18-21, wherein the wireless device may be a station (STA) arranged to operate in accordance with a wireless local area network (WLAN) protocol to receive the PDU from an access point (AP).

In Example 23, an apparatus of a wireless device may comprise means for determining a signal quality metric based at least partly on a channel estimation (CE) field of a protocol data unit (PDU) received from an access point (AP) and determine a carrier frequency offset (CFO) measurement based at least partly on a phase variation in time during a short training field (STF) of the PDU. The PDU may comprise the CE field, the STF field, and a data portion comprising data symbols time-multiplexed with pilot symbols. The apparatus may further comprise means for determining, based at least partly on the signal quality metric and the CFO estimation, whether to compensate phase noise of the data symbols. The apparatus may further comprise means for, if the signal quality metric is greater than or equal to a predetermined signal quality threshold and the CFO measurement is less than a predetermined CFO threshold: as part of the decode operation, compensating the phase noise of the data symbols based at least partly on phase noise estimates of the pilot symbols. The apparatus may further comprise means for, if the signal quality metric is less than the signal quality threshold or if the CFO measurement is greater than or equal to the CFO threshold: refraining from the phase noise compensation of the data symbols as part of the decode operation.

In Example 24, the subject matter of Example 23, wherein the signal quality may be in a group that includes a signal-to-noise ratio (SNR) or a received signal strength indicator (RSSI).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising: memory; and processing circuitry, configured to:
    determine, based at least partly on a training portion of a received protocol data unit (PDU), operational parameters including a signal quality metric and a carrier frequency offset (CFO) measurement, the PDU comprising the training portion and a data portion comprising data symbols time-multiplexed with pilot symbols;
    compare the signal quality metric to a predetermined signal quality threshold and compare the CFO measurement to a predetermined CFO threshold;
    if the signal quality metric is greater than or equal to the signal quality threshold and the CFO measurement is less than the CFO threshold, decode the data portion using phase noise estimates of the pilot symbols; and
    if the signal quality metric is less than the signal quality threshold or the CFO measurement is greater than the CFO threshold, based on the signal quality metric refrain from usage of the phase noise estimates of the pilot symbols to decode the data portion,
    wherein when the phase noise estimates are used to decode the data portion, the processing circuitry is further configured to use an interpolation type for the phase noise estimates that is dependent on a modulation and coding scheme used to modulate the data symbols, the interpolation type comprising non-linear interpolation.

2. The apparatus according to claim 1, wherein the PDU is modulated on a millimeter wave signal in accordance with a single carrier modulation (SCM) scheme.

3. The apparatus according to claim 2, wherein when the phase noise estimates are used to decode the data portion, the processing circuitry is further configured to:
    interpolate the phase noise estimates by a linear interpolation to generate phase noise estimates of the data symbols to decode the data portion if the signal quality metric is in a first range; and
    interpolate the phase noise estimates by a non-linear interpolation to generate the phase noise estimates of the data symbols to decode the data portion if the signal quality metric is in a second range that is higher than the first range.

4. The apparatus according to claim 2, wherein when the phase noise estimates are used to decode the data portion, the processing circuitry is further configured to:
    interpolate the phase noise estimates by a linear interpolation to generate phase noise estimates of the data symbols to decode the data portion if the data symbols are modulated by binary phase shift keying (BPSK) or quadrature phase shift keying (QPSK); and
    interpolate the phase noise estimates by a non-linear interpolation to generate the phase noise estimates of the data symbols to decode the data portion if the data symbols are modulated by quadrature amplitude modulation (QAM).

5. The apparatus according to claim 2, the processing circuitry further configured to, if the signal quality metric is greater than or equal to the signal quality threshold and the CFO measurement is less than the CFO threshold:
    determine the phase noise estimates of the pilot symbols based on received values of the pilot symbols;
    interpolate the phase noise estimates of the pilot symbols to generate phase noise estimates of the data symbols; and
    scale the data symbols based on the phase noise estimates of the data symbols to compensate the phase noise of the data symbols.

6. The apparatus according to claim 5, wherein:
    the signal quality threshold is a first signal quality threshold,
    the processing circuitry is further configured to, if the signal quality metric is greater than or equal to the first signal quality threshold and the CFO measurement is less than the CFO threshold, determine a type of interpolation weights for the interpolation of the phase noise estimates based at least partly on a comparison between the signal quality metric and a second signal quality threshold that is greater than the first signal quality threshold,
    if the signal quality metric is greater than or equal to the first signal quality threshold and less than the second signal quality threshold, the interpolation weights are linear weights inversely related to time differences between symbol locations of the data symbols and the pilot symbols, and
    if the signal quality metric is greater than or equal to the second signal quality threshold, the interpolation weights are non-linear weights that are based on an expected phase noise variation in time.

7. The apparatus according to claim 5, wherein:
    the processing circuitry is further configured to, if the signal quality metric is greater than or equal to the signal quality threshold and the CFO measurement is less than the CFO threshold, determine a type of interpolation weights for the interpolation of the phase noise estimates based at least partly on a modulation size of a symbol constellation for the data symbols,
    if the modulation size is equal to or less than a predetermined modulation size threshold, the interpolation weights are linear weights inversely related to time differences between symbol locations of the data symbols and the pilot symbols, and
    if the modulation size is greater than the modulation size threshold, the interpolation weights are non-linear weights that are based on an expected phase noise variation in time.

8. The apparatus according to claim 7, wherein the modulation size threshold is 4.

9. The apparatus according to claim 2, wherein the signal quality threshold and the residual CFO threshold are based on values at which an expected estimation error of phase noise estimates of the data symbols is above a predetermined estimation error threshold, the phase noise estimates of the data symbols determined based on the phase noise estimates of the pilot symbols.

10. The apparatus according to claim 2, wherein the wireless device is a station (STA) arranged to operate in accordance with a wireless local area network (WLAN) protocol to receive the PDU from an access point (AP).

11. The apparatus according to claim 10, wherein the data symbols include multiple sub-groups of 56 contiguous data symbols, the pilot symbols include multiple sub-groups of 8 contiguous pilot symbols, and the sub-groups of data symbols and the sub-groups of pilot symbols are time-interleaved in the data portion of the PDU.

12. The apparatus according to claim 10, the processing circuitry further configured to:
determine the signal quality metric based at least partly on a channel estimation (CE) field of the PDU; and
determine the CFO measurement based at least partly on a phase variation in time during a short training field (STF) of the PDU.

13. The apparatus according to claim 2, the processing circuitry further configured to determine the operational parameters based at least partly on a training portion of a previous PDU or a data portion of a previous PDU.

14. The apparatus according to claim 2, wherein the processing circuitry includes a baseband processor to determine the operational parameters and to decode the data portion.

15. The apparatus according to claim 2, wherein the apparatus further comprises a transceiver to receive the PDU.

16. A non-transitory computer-readable storage medium that stores instructions for execution by one or more processors to perform operations for communication by a wireless device, the operations to configure the one or more processors to:
determine a signal quality metric based at least partly on a channel estimation (CE) field of a protocol data unit (PDU) received from an access point (AP) and determine a carrier frequency offset (CFO) measurement based at least partly on a phase variation in time during a short training field (STF) of the PDU, the PDU comprising the CE field, the STF field, and a data portion comprising data symbols time-multiplexed with pilot symbols;
determine, based at least partly on the signal quality metric and the CFO estimation, whether to compensate phase noise of the data symbols;
if the signal quality metric is greater than or equal to a predetermined signal quality threshold and the CFO measurement is less than a predetermined CFO threshold: as part of the decode operation, compensate the phase noise of the data symbols based at least partly on phase noise estimates of the pilot symbols; and
if the signal quality metric is less than the signal quality threshold or if the CFO measurement is greater than the CFO threshold, based on the signal quality metric refrain from the phase noise compensation of the data symbols as part of the decode operation,
wherein when the phase noise estimates are used to decode the data portion, the operations configure the one or more processors to use different interpolation types for the phase noise estimates dependent on a modulation and coding scheme used to modulate the data symbols, the interpolation types including linear interpolation and non-linear interpolation.

17. The non-transitory computer-readable storage medium according to claim 15, wherein the signal quality is in a group that includes a signal-to-noise ratio (SNR) or a received signal strength indicator (RSSI).

18. The apparatus according to claim 1, wherein the interpolation type further comprises linear interpolation such that the processing circuitry is configured to use linear interpolation for the phase noise estimates for a first modulation and coding scheme used to modulate the data symbols and non-linear interpolation for the phase noise estimates for a second modulation and coding scheme used to modulate the data symbols.

* * * * *